(12) United States Patent
Rigney et al.

(10) Patent No.: US 6,274,193 B1
(45) Date of Patent: Aug. 14, 2001

(54) REPAIR OF A DISCRETE SELECTIVE SURFACE OF AN ARTICLE

(75) Inventors: Joseph D. Rigney, Milford; Jeffrey A. Conner, Hamilton; Michael J. Weimer, Loveland, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/561,429

(22) Filed: Apr. 28, 2000

Related U.S. Application Data

(63) Continuation-in-part of application No. 09/219,162, filed on Dec. 22, 1998, now Pat. No. 6,203,847.

(51) Int. Cl.$^7$ ................... B32B 1/00; B05D 1/36
(52) U.S. Cl. ............ 427/142; 427/140; 427/287; 427/405; 427/419.1; 427/419.2; 427/264
(58) Field of Search .................. 427/156, 140, 427/142, 287, 405, 419.1, 419.2, 264, 383.7

(56) References Cited

U.S. PATENT DOCUMENTS

| | | |
|---|---|---|
| 3,544,348 | 12/1970 | Boone et al. . |
| 5,167,721 | 12/1992 | McComas et al. ............ 134/32 |
| 5,254,413 | 10/1993 | Maricocchi . |
| 5,658,614 * | 8/1997 | Basta et al. ............ 427/253 |
| 5,723,078 * | 3/1998 | Nagaraj et al. ............ 264/36 |
| 5,897,966 * | 4/1999 | Grossklaus et al. .......... 428/652 |
| 5,915,743 | 6/1999 | Palmas ................ 29/402.18 |
| 5,972,424 | 10/1999 | Draghi et al. . |
| 6,036,995 | 3/2000 | Kircher et al. ............ 427/142 |
| 6,045,863 | 4/2000 | Olson et al. ............ 427/253 |
| 6,146,692 * | 11/2000 | Sangeeta et al. .......... 427/142 |

OTHER PUBLICATIONS

U.S. application No. 08/886,504, Grossklaus, Jr. et al., filed Jul. 1, 1997.

* cited by examiner

Primary Examiner—Fred J. Parker
Assistant Examiner—Jennifer Kolb
(74) Attorney, Agent, or Firm—Andrew C. Hess; Gerry S. Gressel

(57) ABSTRACT

A method for restoring a protective coating including a metallic environmental resistant coating of a coating total thickness within a coating design thickness range on a metal substrate of an article includes the application of a replacement material to at least one discrete local surface area on which an undesirable amount of degradation has occurred. Such degradation can extend through the protective coating into the metal substrate. The degradation product can include at least one of oxidation, coating rumpling, and coating voiding, for example, rumpling or voiding of a bond coat under a ceramic thermal barrier coating (TBC). The degradation product first is conditioned at the discrete local area to expose an underlying portion while retaining at least a portion of the metallic environmental coating on surface areas adjacent the discrete surface area. Then a replacement metallic environmental resistant material is applied, retaining the coating total thickness within the coating design thickness range. If the protective coating includes a TBC, a replacement TBC then is applied over the replacement material.

12 Claims, 6 Drawing Sheets

REPAIR OF A DISCRETE SELECTIVE SURFACE OF AN ARTICLE

This application is a continuation-in-part of patent application Ser. No. 09/219,162, filed Dec. 22, 1998, now U.S. Pat. No. 6,203,847.

BACKGROUND OF THE INVENTION

This invention relates to the repair of a protective coating on an article, and, more particularly, to the treatment of a local, discrete portion of the coating.

Certain articles, such as components operating in the hotter gas path environment of gas turbine engines are subjected to significant temperature extremes in an oxidizing atmosphere and corrosive contaminants such as sulfur, sodium, calcium and chlorine which are present in the combustion gases. As a result of service operation in and exposure to such an environment, surfaces of components such as turbine blades and vanes are subject to various types of degradation, including oxidation degradation, which herein is intended to include within its meaning corrosion and sulfidation degradation. To protect the component substrate from excessive environmental attack, surfaces of such components normally are treated with a protective coating system including a metallic environmental resistant coating of a type widely reported in the gas turbine engine art. These environmental resistant coatings generally are classified as diffusion or overlay coatings, distinguished by the processing methods or degree of substrate consumption during deposition.

Reported metallic environmental resistant coatings sometimes are referred to as diffused aluminide coatings as well as overlay coatings. Such coatings rely on interdiffusion of an applied coating element such as Al with an element on which a substrate is based, for example Ni, to create an intermetallic surface layer. These coatings have been applied by a variety of methods including pack cementation, above the pack, vapor phase, chemical vapor deposition and slurry type coating. The thickness and aluminum content of the end product coating can be controlled by varying such coating parameters and materials as the coating source materials, coating time, coating temperature and aluminum activity. For example, such control is reported in a variety of U.S. Pat. No. including 3,544,348—Boone et al. (patented Dec. 1, 1970), and U.S. Pat. No. 5,658,614—Basta et al. (patented Aug. 19, 1997). The oxidation resistant performance of diffused aluminide coatings has been shown to be enhanced by incorporating at least one of Pt, Rh, Pd, Hf, Si, Y and Zr. To incorporate these elements, thin layers of such elements generally are deposited by electroplating or physical vapor deposition means, prior to the aluminide coating cycle.

It has been observed that, as a result of engine operation under such strenuous operating conditions, degradation has occurred at least in some local areas. Such degradation can include oxidation products substantially completely through the metallic environmental resistant coating into the metal substrate as well as production of defects in the metallic environmental coating. Forms of such defects sometimes are referred to as "rumpling" and as coating voiding, one example of which is bond coat voiding. Such degradation can extend not only into the protective coating, such as a bond coat or portions of a diffused aluminide, but also can extend completely through the protective coating into the substrate of the article.

Degradation of the original coating composition that occurs during engine service operation varies in intensity across surfaces of a turbine airfoil, with some surfaces experiencing very little attack or composition loss. However, a current repair practice includes the complete removal from all coated surfaces of the protective diffused coatings or overlay coatings prior to repair. The complete removal results in loss of wall thickness, from removal of the interdiffused region, which reduces component load bearing capability. Additionally, complete coating removal creates problems with maintenance of designed cooling air flow patterns and flow rates for air cooled components. Such problems can occur at points at which cooling holes, communicating with internal cooling passages, intersect the component outer surface from which the coating has been removed and must be replaced for component reuse.

BRIEF SUMMARY OF THE INVENTION

The present invention, in one form, provides a method for restoring a protective coating including a metallic environmental resistant coating, having a coating total thickness within a coating design thickness range, on a metal substrate of an article that has experienced service operation. The protective coating has at least one discrete local surface area that includes an undesirable amount of degradation resulting from exposure to service operation. In one form, the degradation extends through the coating into the metal substrate of the article. In another form, the degradation comprises rumpling or coating voiding of at least an outer portion of the metallic environmental resistant coating. The method comprises conditioning the degradation products at least from the discrete surface area to expose an underlying portion substantially while retaining at least a portion of the metallic environmental resistant coating on surface areas adjacent the discrete surface area. Then at least the discrete surface area is coated with a replacement metallic environmental resistant coating selected from aluminides and alloys including aluminum using coating parameters selected to maintain the coating total thickness substantially within the coating design thickness range.

DETAILED DESCRIPTION OF THE INVENTION

Figure 1:
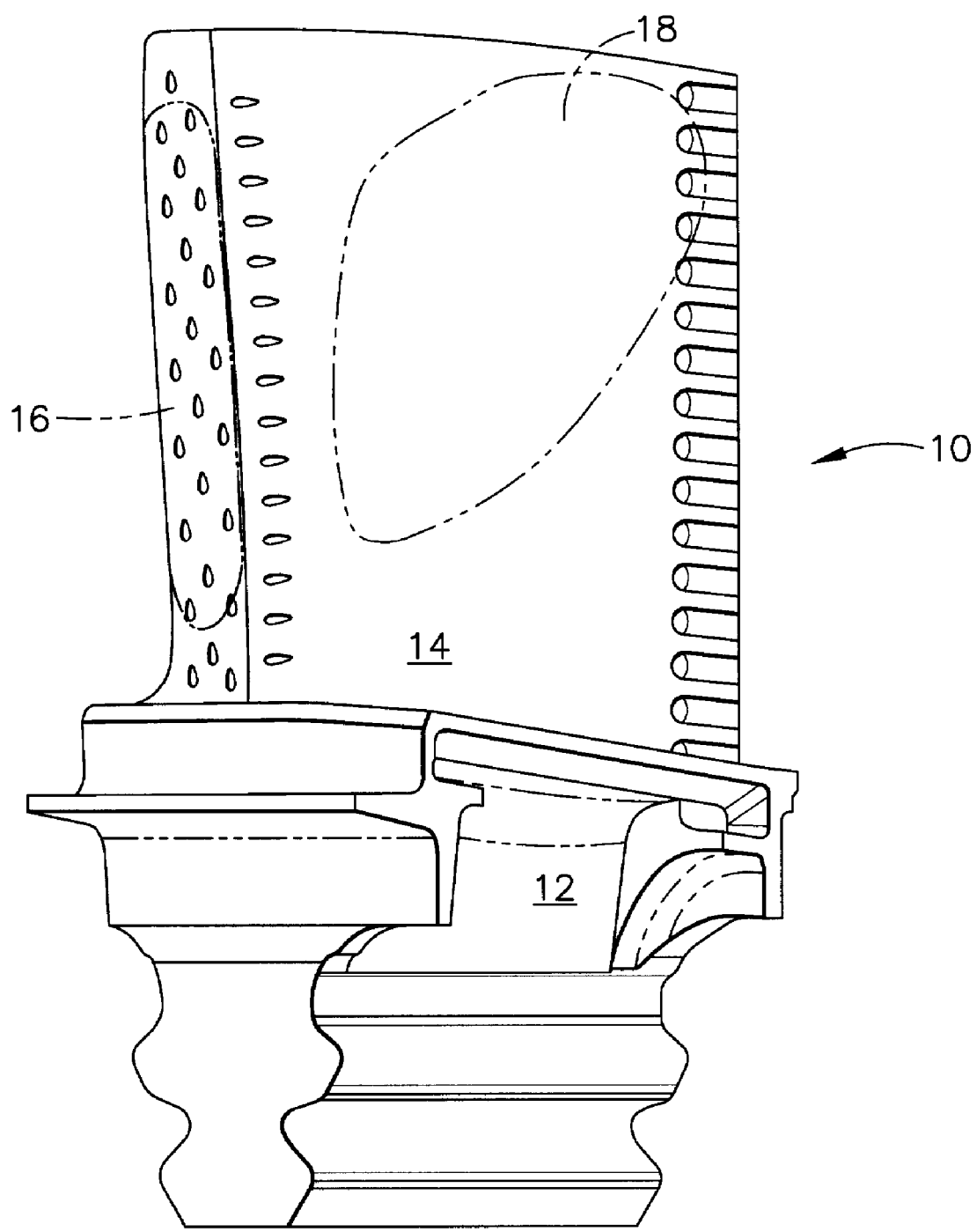
FIG. 1 is a perspective, diagrammatic view of a gas turbine engine blade from the concave side showing discrete, local coating surface areas of heavier degradation in the form of spalling resulting from service operation.

Each specific design of gas turbine engine turbine blade has its own unique environmental "attack pattern" of more severe degradation, including products of oxidation, coating spalling, coating rumpling, coating voiding, etc., of a protective coating occurring during service operation in an engine for which it has been designed. One such attack pattern of selective, discrete surface areas of undesirable degradation in the form of thermal barrier coating (TBC) spalling is shown in the perspective, diagrammatic view of FIG. 1. In FIG. 1, a gas turbine engine turbine blade for use in a high pressure turbine, shown from its concave side generally at 10, comprises a base 12 and an airfoil 14 which includes thereon a coating system. One form of such a coating system included a metallic environmental resistant coating shown generally at 22 in FIG. 2 on substrate 20. In this form of system including an outer ceramic TBC, the substrate was a Ni base superalloy sometimes referred to as Rene' 142 alloy. Coating 22, in that embodiment was a diffusion aluminide type of coating generally called a Pt—Al coating, the application of which included vapor phase diffusion aluminiding. Coating 22 comprised an additive portion 24 and a diffusion zone or portion 26. Completing the coating system in FIG. 2 was an outer TBC 15. Forms of the metallic environmental resistant coating 22 include diffusion aluminide coatings as well as overlay coatings of an alloy including Al. For example, widely reported overlay coatings used in the gas turbine engine art are the MAl or MAlY general type of overlay coating in which M is at least one element selected from Fe, Ni, and Co, and Y represents yttrium or any combination of oxygen active elements. In some forms, such overlay coatings include the element Cr.

Figure 2:
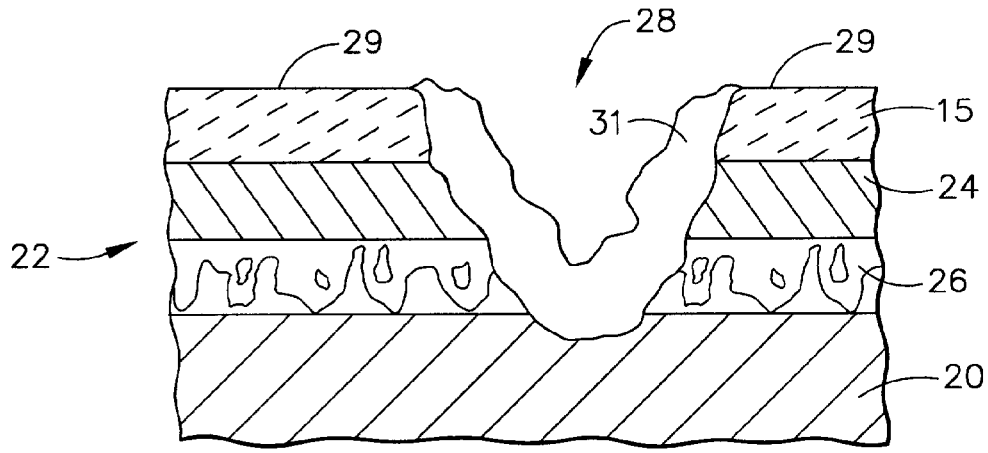
FIG. 2 is diagrammatic, fragmentary sectional view including a portion of one type of environmental resistant coating including an outer thermal barrier coating (TBC) and through which oxidation degradation extends through the coating into the metal substrate.

In the embodiment of FIG. 2, such an environmental resistant coating 22 has been included in a protective coating or coating system that includes the outer ceramic TBC 15. TBC outer coating portions have been widely used and described in the gas turbine engine art. Typically, such a ceramic coating comprises primarily zirconia stabilized with yttria. Shown in FIG. 1 on the concave side of the blade, on which a major portion of such attack generally occurs to one design of a turbine blade, are typical discrete local coating surface areas 16 and 18. Such surface areas have been degraded primarily by TBC spalling during engine service operation to define an environmental attack pattern for that particular blade design.

When attack in a discrete area exceeds specified limits, conditioning of the degradation is required and reapplication of the coating must be conducted before the article can be returned to service operation. Conditioning herein is defined to include one or more of removal of the degradation, for example of oxidation products, and surface treatment of coating rumpling and/or coating voiding, including removing a coating portion to expose coating voiding.

Current state of the art practice in preparation for coating reapplication includes removal of the entire surface protective coating, not just from the undesirably degraded portions, and subsequent coating reapplication on all surfaces, not just the attacked areas, without control of wall thickness in respect to design limits. Typical design total coating thickness limits for aircraft engine turbine blades are in the range of about 1–5 mils for diffusion aluminides and about 1–10 mils for the metallic overlay coatings. As was discussed above, complete removal of the coating can result in detrimental wall thinning and/or problems relating to cooling hole openings in the article surface. Overcoating of an entire surface without control of coating total thickness can result in significant increase in such thickness beyond design limits. Not only can such increase in coating total thickness disrupt airflow patterns across a blade, but also it can adversely affect mechanical properties of the article.

Figure 3:
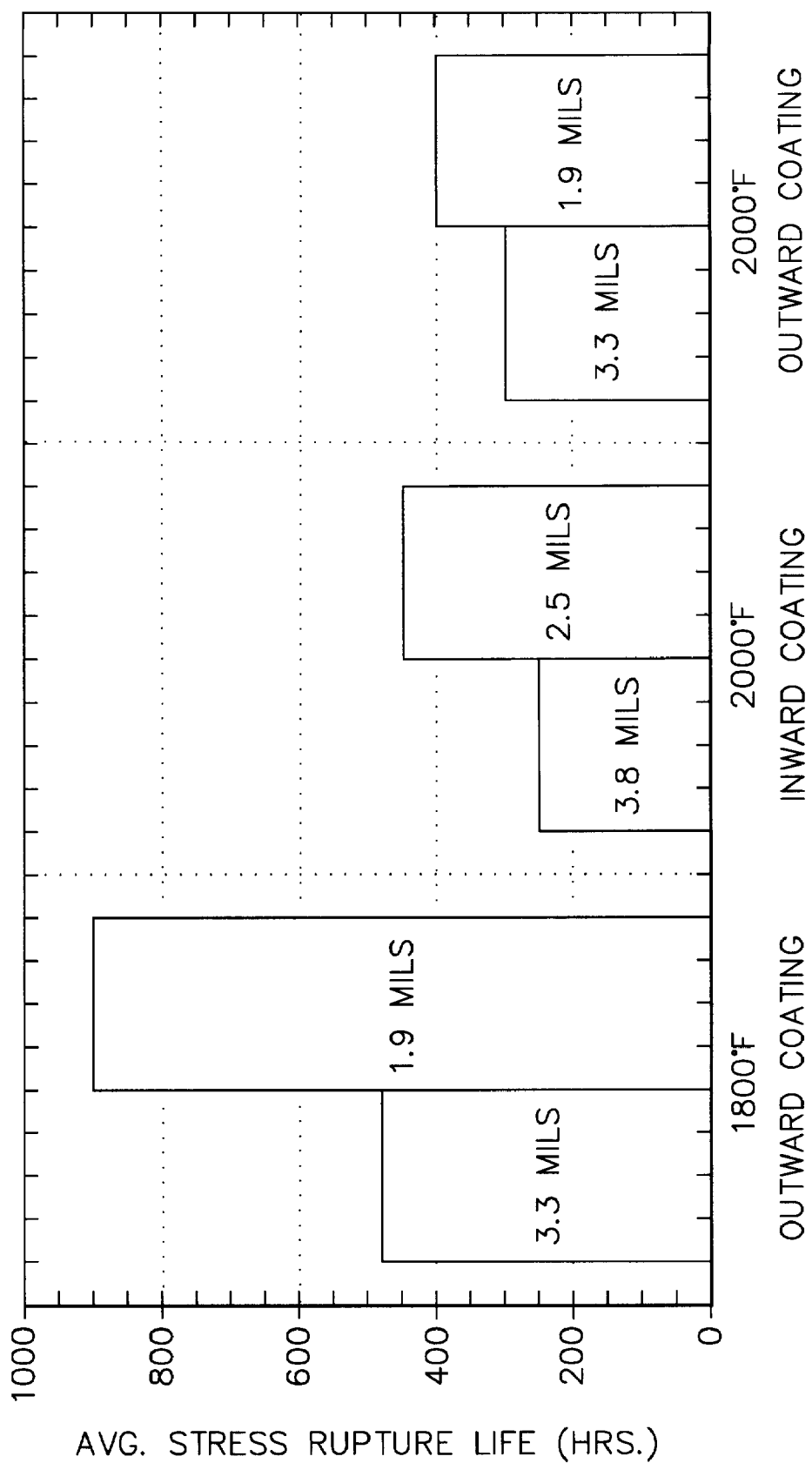
FIG. 3 is a graph showing the effect of coating thickness on average stress rupture life of a Ni base superalloy single crystal material.

Numerous existing mechanical property data bases show a strong correlation between coating thickness and key mechanical properties, such as stress rupture strength, high cycle fatigue resistance, etc. Substantial decreases in mechanical properties can occur as coating thickness increases, especially on advanced nickel base superalloys where rapid interdiffusion occurs between the substrate and the coating, due to high refractory element content of such alloys. Additionally, thicker coatings are more prone to craze cracking than thinner coatings during thermal transients experienced during engine operation. Therefore, total coating thickness is selected for a particular design of article such as a turbine blade to be within a design thickness range not only for airflow considerations but also to maintain desired mechanical properties for the article during operation. Typical of such data showing one relationship of coating thickness to mechanical properties and that properties can be reduced with increasing thickness are the data included in the graph of FIG. 3 showing the effect of coating thickness on the average stress rupture life of a commercially used Ni base superalloy single crystal material. The coating was a commercially used Pt—Al type of coating.

In FIG. 3, "inward" and "outward" refer to the predominant diffusion direction during coating formation. Inward diffusion indicates that the coating is formed primarily by diffusion of aluminum into the substrate surface with limited outward diffusion of nickel (i.e. low temperature combined with high aluminum activity). Outward diffusion indicates that the coating if formed by outward diffusion of nickel along with inward diffusion of aluminum (i.e. high temperature combined with lower aluminum activity).

A form of the present invention provides a method for the restoration of environmental resistance to a coating on an article while maintaining article design limits and substantially avoiding reduction in mechanical properties associated with increase in coating thickness. For service operated coated articles, this form of the invention is accomplished by removal of a TBC (if present) and selective conditioning of discrete, local surface areas of excessive, undesirable degradation. For example, conditioning can include removal of oxidation products to expose an underlying surface substantially free of oxidation products, surface treatment of coating rumpling or coating voiding, removal of a portion of a coating to expose coating voiding, and their combinations. The metallic environmental coating on surface areas adjacent the selective discrete areas are retained during such conditioning of the undesirable degradation, and an inner portion of the coating on the article substrate at the local, discrete areas may be retained as well. Such conditioning can be achieved by mechanical or chemical means or their combination so as not to harm an adjacent coating.

The series of diagrammatic, fragmentary sectional FIGS. 4, 5, 6 and 7 shows one form of the present invention. In that series of figures, article substrate 20 was a commercially used Ni base superalloy sometimes referred to as Rene' 142 material and on which had been applied as a metallic environmental resistant coating a commercially available Pt—Al coating shown generally at 22. Coating 22 included an outer portion 24 and an inner portion 26 diffused with substrate 20 in a manner well known in the art. In the embodiment of this series, a ceramic TBC 15 was included on environmental resistant coating 22 to complete the coating system. When a TBC is required in a coating system as in this example, metallic coating 22 acts as a bond coat between substrate 20 and TBC 15. When such a TBC was present, it first was removed to provide the form shown in FIG. 4. However, in other examples using a different Ni base superalloy sometimes referred to as Rene' 125 material having a commercially available CODEP aluminide coating, a TBC was not included in the coating system.

Figure 4:
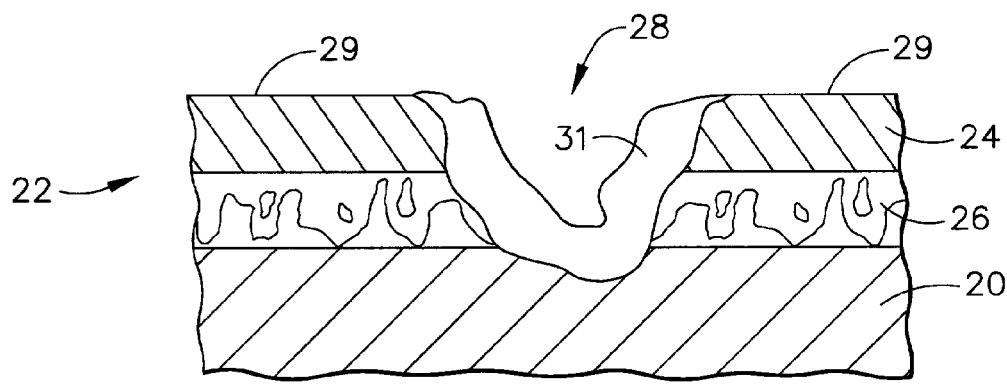
FIG. 4 is a diagrammatic sectional view of a portion of an environmental resistant coating, that either did not initially include an outer TBC or from which an outer TBC has been removed, showing oxidation degradation extending through the coating into the metal substrate.

During gas turbine engine service operation, a discrete, local area at 28, for example in FIG. 4, located between adjacent areas 29 of the coating outer portion 24, experienced TBC spallation and bond coat degradation represented by degradation products 31. In the embodiment of FIG. 4, the degradation products 31 extended through TBC 15 and through environmental resistant coating 22 into substrate 20. For practice of one form of the method of the present invention, products 31 were oxidation degradation products and were conditioned by removal selectively from the discrete location at 28 by chemical and mechanical means. In the form shown in FIG. 4, the TBC first was removed by any available means used in the art for TBC removal and which does not significantly degrade the underlying metallic environmental coating. Such conditioning by removal of degradation products exposed an underlying portion 30 in FIG. 5, in this example surface portion 30 extending to within substrate 20, substantially free of such degradation products 31.

Figure 6:
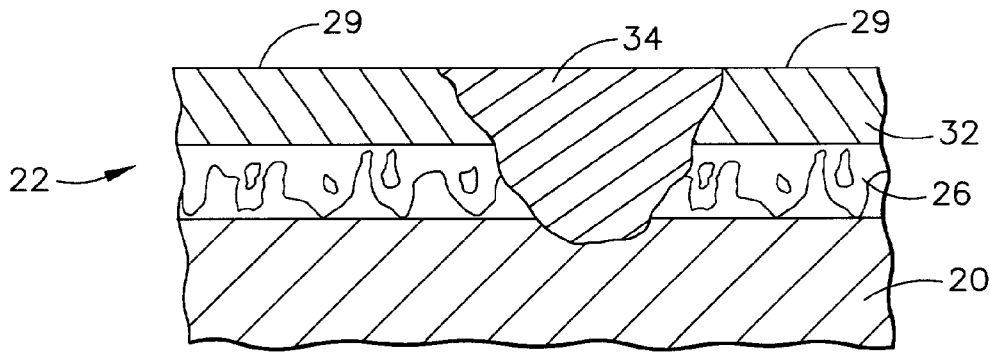
FIG. 6 is a diagrammatic, sectional view of FIG. 5 showing deposition of replacement material at the position of degradation product removal.

After removal of TBC 15 and the selective removal of the degradation products 31, in this example oxidation products, from location 28, a replacement metallic material 34, FIG. 6, was provided in the void at location 28. Provision of the replacement material 34 was accomplished by first depositing a metal such as Pt, Rh, and/or Pd at least on a surface portion 30 in the void at location 28. The metal, which in this example was Pt, was deposited on surface portion 30 to a thickness which, when the metal is diffused and combined in aluminide coating to provide a Pt—Al coating 22, as described below, will be within a coating design thickness range of the original coating. As was stated above, generally for gas turbine engine high pressure turbine blades the coating design thickness for metallic overlay coatings, such as the MCrAl type coating, is in the range of about 1–10 mils and for metallic diffusion aluminide coatings is in the range of about 1–5 mils. Deposited Pt thickness typically is relatively small, in the range of about 2–10 microns for such gas turbine engine blade applications. As is well known and reported in the art, conveniently such element as Pt can be applied by electrodeposition. However, alternatively such metals can be applied by other methods including spraying, sputtering, etc.

After deposition of a metal such as Pt selectively on surface 30 in at least discrete location 28, the metal was heated to diffuse the metal into coating 22. Typically for a Pt deposit, the heat treatment was in the range of about 900–1150° C. for a time, for example 0.5–4 hours, sufficient to diffuse the metal into the underlying portion represented by surface portion 30. Heat treatment at this point in the method, before subsequent aluminiding, eliminates the need for extended high temperature exposure during the aluminide cycle that in certain known methods is practiced to accomplish both Pt diffusion and diffusion aluminiding at the same time. Also, it provides significant flexibility in the selection of the aluminiding process and parameters for the aluminiding of the surface substantially without increase in coating total thickness beyond the coating design thickness, according to the present invention.

Following diffusion heat treatment of such metal as Pt in this example, the entire outer surface was diffusion aluminided to complete provision of replacement metallic environmental resistant material 34 at location 28, as shown in FIG. 6. The aluminiding used material application parameters, in this example coating parameters, selected to produce a Pt—Al coating portion on the selective discrete surface area 30 at location 28. This appropriate selection of material application parameters enabled provision of the replacement metallic material 34 without substantial increase in thickness in adjacent areas 29, and while maintaining the total thickness of coating 22 within the coating design thickness range.

Figure 7:
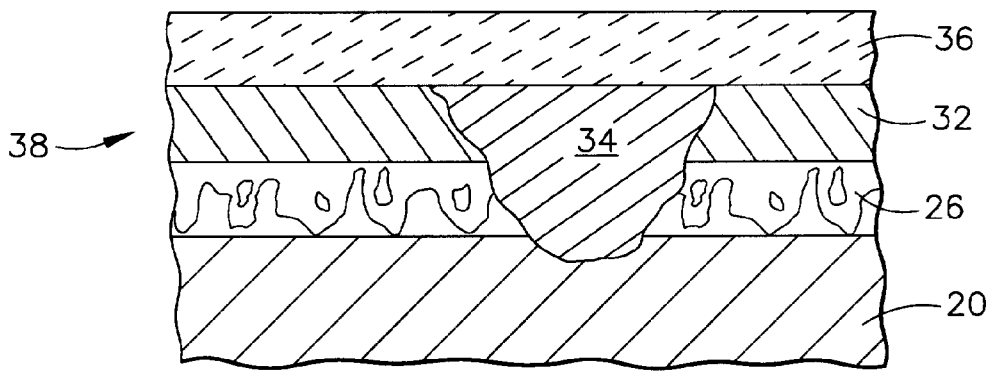
FIG. 7 is a diagrammatic sectional view of FIG. 6 over which a replacement TBC has been applied.

In this example after aluminiding, a replacement TBC was applied to the designed locations by a commercial electron beam physical vapor deposition method. One example of the resulting coating according to the present invention is shown in the fragmentary diagrammatic sectional view of FIG. 7. That figure shows the replacement metallic Pt—Al metallic material 34 at the selective discrete area previously identified as location 28 and a new, aluminum enhanced outer metallic coating portion 32, without substantial increase in coating thickness, within the coating design thickness range. In FIG. 7 disposed over replacement Pt—Al material 34 and enhanced outer coating portion 32 in this example is a replacement TBC 36, with the combination of replacement material 34, enhanced coating portion 32, and TBC 36 completing restored protective coating shown generally at 38.

During evaluation of the present invention, a gas turbine engine air cooled high pressure turbine blade which had experienced engine operation service was inspected for oxidation degradation on the airfoil surface. The blade was manufactured from a commercially used Ni base superalloy sometimes referred to as Rene' 142 alloy and included on the airfoil the above-described Pt—Al metallic aluminide coating. The coating design thickness range for the Pt—Al coating, as a TBC bond coat for this article, was 1–4 mils. As manufactured, the metallic coating thickness for the turbine blade was in the range of about 2–3 mils. The inspection disclosed discrete local surface areas at which an outer TBC had spalled and degradation such as oxidation or undesirable chemical changes of the underlying bond coat had occurred in an attack pattern on the airfoil similar to that shown in FIG. 1. Such degradation, which extended into the Ni base superalloy substrate, required repair before the blade could be returned to operation service.

Figure 5:
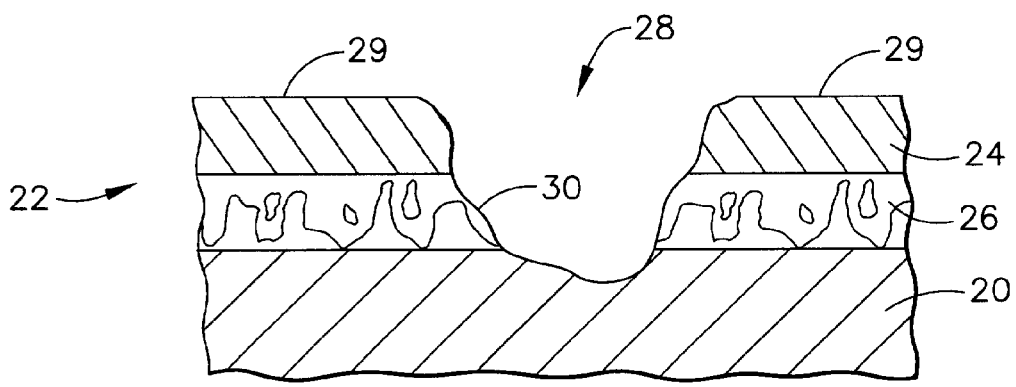
FIG. 5 is a diagrammatic sectional view as in FIG. 4 showing that portion from which the degradation has been removed to expose an underlying portion substantially free of products of such degradation.

The TBC over the entire airfoil was removed by a combination of chemical and mechanical means used commercially in the art for such purpose without adversely affecting the integrity of the underlying metallic bond coat. If superficial surface contaminants and/or oxidation products are present after TBC removal, they can be cleaned for example using a chemical cleaning process. The balance of the coating was retained, generally as shown in FIG. 5. Retained as well was the complete metallic environmental coating on airfoil surfaces adjacent the selective, discrete surfaces.

The discrete, local areas from which oxidation and corrosion was removed were electroplated with Pt to a thickness of about 2–3 microns. The Pt thus deposited was heated in a non-oxidizing atmosphere at a temperature of about 1050° C. for about 2 hours to diffuse the Pt into the remaining portion of the original coating.

After such diffusion heat treatment of the Pt deposit, the entire surface of the airfoil was aluminided using a commercial vapor phase (above the pack) type of aluminide coating process using coating parameters selected to maintain the total metallic coating thickness within a coating design thickness range of about 1–5 mils. This completed the provision of a metallic replacement material in the discrete local areas and enhanced the metallic coating elsewhere on the surface. After aluminiding, a replacement TBC was deposited by electron beam physical vapor deposition over the entire surface of the airfoil. Resulting from the practice of the present invention, as represented by this example, was a restored metallic bond coat with a coating total thickness within the coating design thickness range. At the same time, the blade was provided with enhanced resistance to oxidation.

Figure 8:
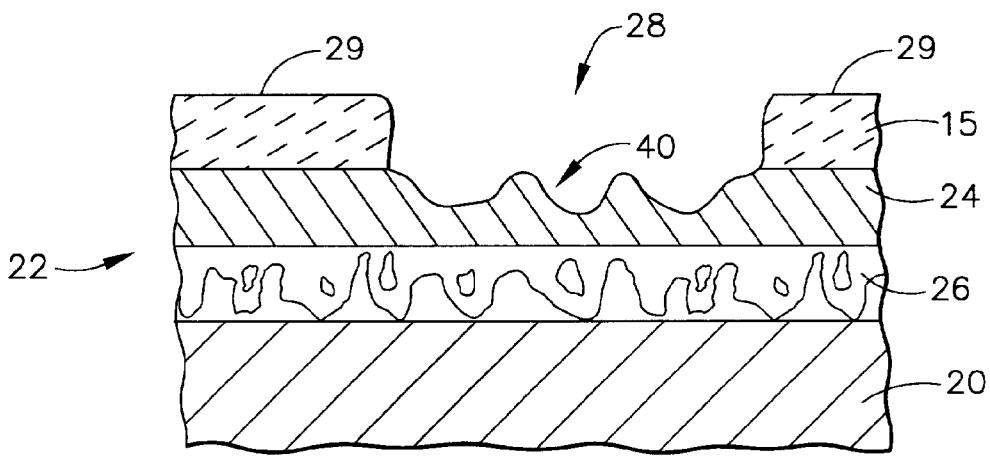
FIG. 8 is a diagrammatic, fragmentary sectional view of an environmental resistant coating portion in which degradation in the form of rumpling has occurred at an outer portion of a metallic bond coat for a TBC.
Figure 11:
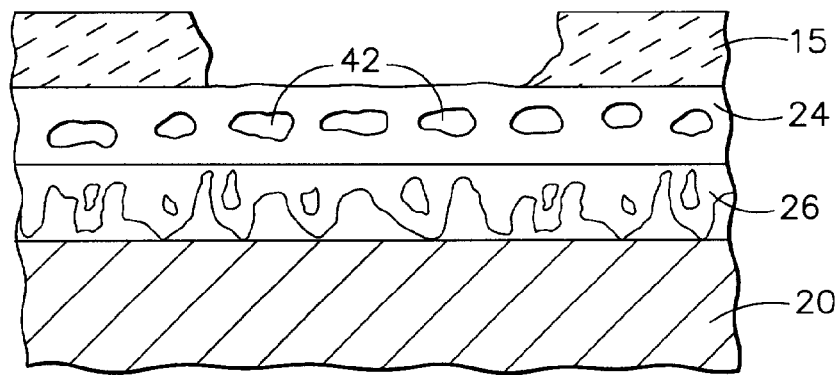
FIG. 11 is a diagrammatic, fragmentary sectional view of an environmental resistant coating portion in which degradation in the form of metallic bond coat voiding has occurred during service operation.

Other forms of the present invention relate to restoring a protective metallic coating that, during operation, had experienced degradation defects in the form of rumpling or of coating voiding, for example of a bond coat beneath an outer TBC. Examples of such degradation conditions are shown in the fragmentary, diagrammatic sectional views of FIGS. 8 and 11.

In a protective coating system as shown and described generally in connection with FIG. 2, as a result of engine operation, outer TBC 15 at discrete, local surface location 28 had separated by spalling. In one example, it was observed that a degradation condition sometimes referred to as rumpling, shown generally at 40 in FIG. 8, had occurred during engine operation in outer portion 24 of bond coat 22. In another example, it was observed that a degradation condition sometimes referred to as bond coat voiding, shown at 42 in FIG. 11, had occurred during engine operation within bond coat 22.

Figure 9:
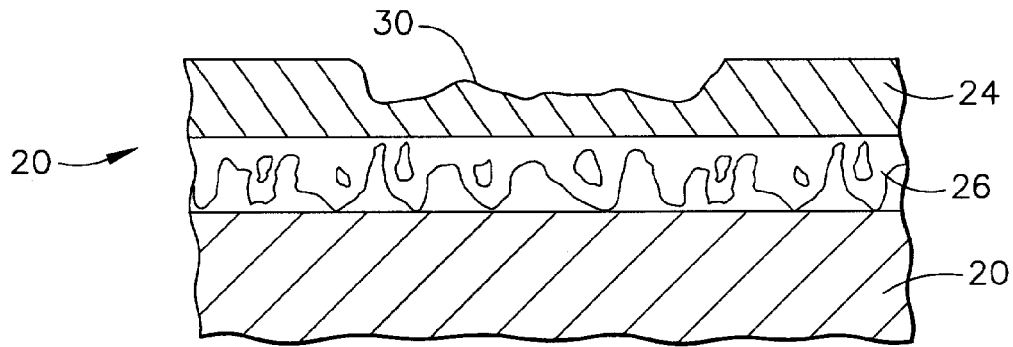
FIG. 9 is a diagrammatic sectional view of the portion of FIG. 8 after removal of the TBC and conditioning of the rumpling.

In these examples, according to forms of the present invention, the TBC was removed as described above. Then the degradation was conditioned to receive replacement material 34. The rumpling 40 in FIG. 8 was conditioned by removing any oxidation scale to expose surface 30 substantially free of such degradation, as shown in FIG. 9, to prepare rumpling 40 for application of replacement metallic material 34. Application of replacement material tends to reduce the surface contours associated with rumpling. The bond coat voiding 42 in FIG. 11 was conditioned by mechanical means, for example grit blasting, to remove an outer portion of the bond coat material sufficient to expose voiding 42. This provided an underlying portion 30 of bond coat 22 in preparation for restoration.

Figure 10:
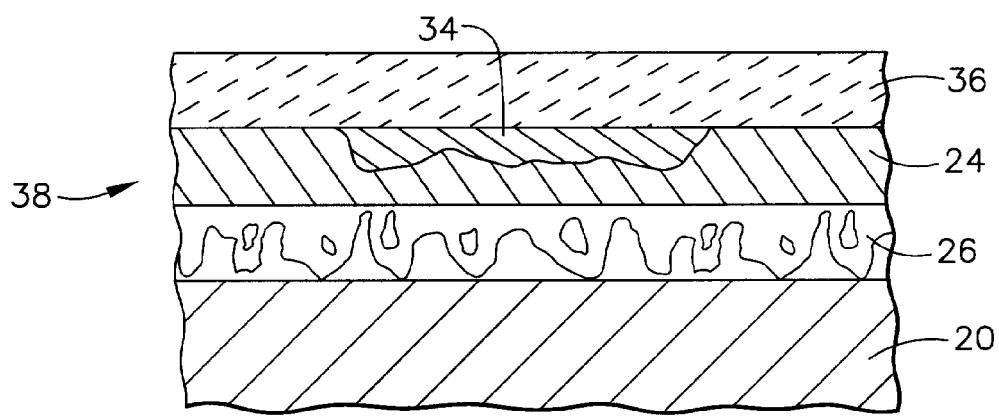
FIG. 10 is a diagrammatic sectional view of FIG. 9 after deposition of a replacement metallic material at the conditioned portion and a replacement TBC over the replacement metallic material.
Figure 12:
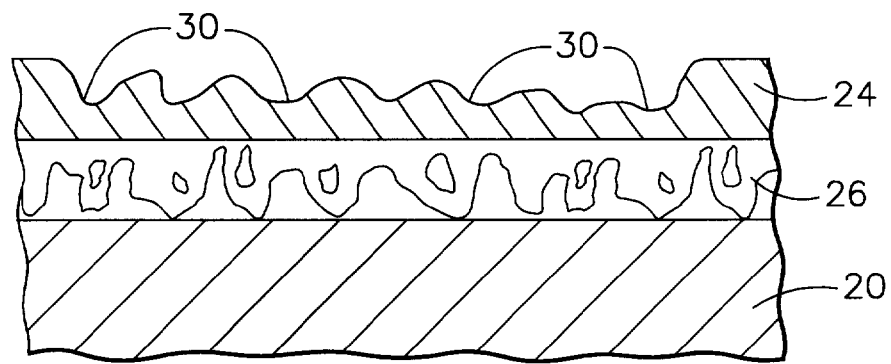
FIG. 12 is a diagrammatic sectional view of the portion in FIG. 11 after removal of TBC and conditioning of the bond coat to expose voiding.
Figure 13:
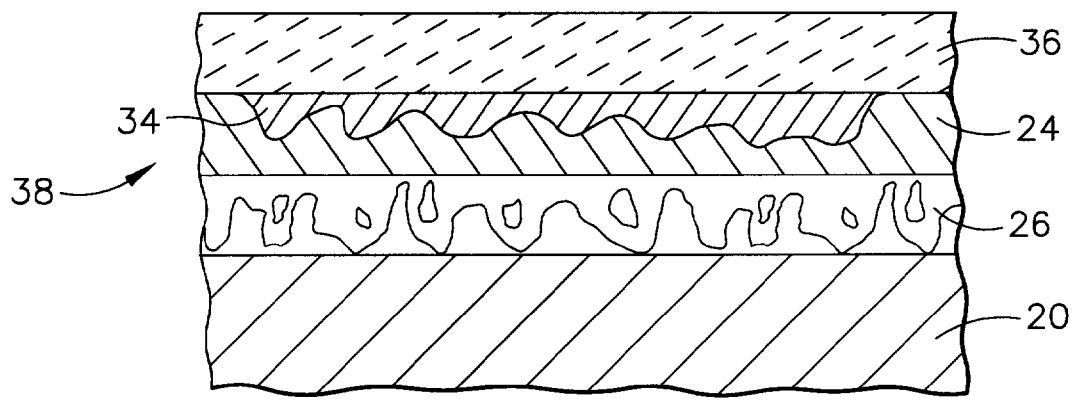
FIG. 13 is a diagrammatic sectional view of FIG. 12 after deposition of replacement metallic material at the conditioned portion and of a replacement TBC over the replacement metallic material.

Replacement Pt—Al bond coat material 34 and replacement TBC 36 were applied to surfaces 30 in FIGS. 9 and 12, as described above in connection with FIGS. 6 and 7. This provided the restored protective coating 38 as shown in FIGS. 10 and 13, respectively.

This invention provides a method for restoring protective coatings exposed to service operation, such as in the gas path environment of gas turbine engines, with coating application in at least discrete, local areas to match actual needs for such protection. This is accomplished without complete removal of a metallic environmental protective coating or removal of such coating from adjacent coated surfaces.

The present invention has been described in connection with specific examples and embodiments that are intended to be typical of rather than in any way limiting on the scope of the present invention. Those skilled in the arts associated with this invention will understand that it is capable of variations and modifications without departing from the scope of the appended claims. For example, the oxidation, bond coat rumpling, and/or bond coat voiding as an attack pattern will vary with each article design and removal of degraded surfaces can be accomplished by a variety of published processes while retaining the coating and coating portions as described above. Also, the application of coating metal, as well as the aluminiding application, can be accomplished by a variety of known processes, provided that the thickness considerations and limitations of the present method are fulfilled.

What is claimed is:

1. A method for restoring a protective coating including a metallic environmental resistant coating of a metallic environmental resistant coating total thickness within a metallic environmental resistant coating design thickness range on a metal substrate of an article which has experienced service operation, the metallic environmental resistant coating of the protective coating having at least one discrete local surface on which is an undesirable amount of degradation product which includes at least one degradation product selected from the group consisting of oxidation completely through the metallic environmental coating into the substrate, a defect of rumpling of at least the metallic environmental resistant coating, and a defect of voiding of at least the metallic environmental resistant coating resulting from exposure to service operation; comprising the steps of:

conditioning the degradation product at least at the discrete surface area to expose an underlying portion while retaining at least a portion of the metallic environmental resistant coating on surface areas adjacent the discrete surface area; and then, applying a replacement metallic environmental resistant material selected from the group consisting of aluminides and alloys including aluminum to at least the discrete surface area to fill the entire discrete surface area with said material to a thickness of the metallic environmental resistant coating substantially within the metallic environmental resistant coating design thickness range.

2. The method of claim 1 in which the degradation product extends through the protective coating into the metal substrate.

3. The method of claim 1 in which:

a degradation product is oxidation; and, the oxidation is removed to expose the underlying portion substantially free of oxidation.

4. The method of claim 1 in which:

the protective coating includes a ceramic thermal barrier coating (TBC) disposed over the metallic environmental resistant coating that is a bond coat for the TBC;

the degradation product at the discrete local surface area extends through the TBC and at least into the bond coat; and, the TBC is removed prior to conditioning of the degradation product.

5. The method of claim 4 in which the degradation product extends through the protective coating into the metal substrate.

6. The method of claim 4 in which a replacement TBC is applied over the replacement metallic environmental resistant material.

7. The method of claim 1 in which:

the replacement metallic environmental resistant material is a diffusion aluminide including at least one metal selected from the group consisting of Pt, Rh, and Pd;

the diffusion aluminide after diffusion with the underlying portion having a total thickness within the coating design thickness range.

8. The method of claim 7 in which:

the at least one metal is applied at least to the underlying portion;

the metal is heated at a temperature and for a time sufficient to diffuse the metal into the underlying portion; and then, at least the metal is diffusion aluminided.

9. The method of claim 8 in which:

the article is a gas turbine engine blade including an airfoil surface;

the substrate is a Ni base superalloy;

the discrete local surface area is on the airfoil surface;

the coating design thickness range is about 1–10 mils;

the coating total thickness range is about 1–10 mils;

the metal is Pt applied to a thickness in the range of about 2–10 microns;

the Pt is heated within the range of about 900–1150° C. for about 0.5–4 hours; and then, the Pt is aluminided.

10. The method of claim 9 in which:

the coating design thickness is in the range of about 1–5 mils;

the coating total thickness is in the range of about 1–5 mils; and, the Pt is applied to a thickness in the range of about 2–3 microns.

11. The method of claim 9 for restoring a protective coating which includes a TBC disposed over the metallic environmental resistant coating that is a bond coat for the TBC, in which:

the TBC is removed prior to conditioning of the degradation product; and, the degradation product at the discrete local surface area extends through the TBC and at least into the bond coat.

12. The method of claim 11 in which a replacement TBC is applied over the replacement metallic environmental resistant material.

* * * * *